United States Patent Office 2,977,358
Patented Mar. 28, 1961

2,977,358

STEROID SAPOGENIN COMPOUNDS AND PROCESS FOR THEIR PRODUCTION

Carl Djerassi, Birmingham, Mich., and Alan J. Lemin, George Rosenkranz, and Franz Sondheimer, Mexico City, Mexico, assignors to Syntex S.A., Mexico City, Mexico, a corporation of Mexico No Drawing. Filed Feb. 16, 1955, Ser. No. 488,707

Claims priority, application Mexico Feb. 22, 1954

21 Claims. (Cl. 260—239.55)

The present invention relates to cyclopentanophenanthrene compounds and to a novel process for the production thereof.

More particularly, the present invention relates to novel compounds of the steroidal sapogenin series having the $\Delta^{7,9(11)}$ grouping, to valuable intermediates derived from these compounds and having either an 11-keto group or a 9α,11α-epoxido group and to a novel process for the production of these compounds. The novel compounds of the present invention, as will be hereinafter set forth in detail, are valuable intermediates for the production of cortical hormones having an 11-keto group.

In the United States patent application of Stork, Pataki, Rosenkranz and Djerassi, Serial Number 338,143, filed February 20, 1953, now abandoned, there is disclosed a method for the preparation of a lower fatty acid ester as the acetate of the 5.8-peroxide of $\Delta^{6,9(11)}$-22a-spirostadien-3β-ol a valuable intermediate for the preparation of cortical hormones.

In accordance with the present invention there has been discovered a novel process for the preparation from the aforementioned peroxide a novel intermediate $\Delta^{7,9(11)}$-22a-spirostadiene-3β,5α-diol and/or its esters.

There has further been discovered in accordance with the present invention a novel process for the preparation from $\Delta^{7,9(11)}$-22a-spirostadiene-3β,5α-diol and/or its esters the novel intermediates i.e. the 9α,11α-monoepoxides of $\Delta^{7}$-22a-spirostene-3β,5α-diol and or its esters and $\Delta^{7}$-22a-spirosten-5α-ol-3-one. These compounds are intermediates for the production of the novel $\Delta^{4,8}$-22a-spirostadiene-3,11-dione a valuable intermediate for the production of cortisone as will be hereinafter set forth in detail. The novel intermediate $\Delta^{7,9(11)}$-22a-spirostadiene - 3β,5α - diol compounds are also in accordance with the present invention the starting material of a novel process for the production of the novel 7α,8α; 9α,11α-diepoxides of 22a-spirostane-3β,5α-diol and/or its esters and of 22a-spirostane-5α-ol-3-one. These last mentioned compounds are intermediates for the production of the novel 7α,8α; 9α,11α-diepoxide of $\Delta^{4}$-22a-spirostene-3-one also a valuable intermediate for the production of cortisone as will be hereinafter set forth in detail.

A portion of the process of the present invention involving the production of the intermediate $\Delta^{7,9(11)}$-22a-spirostadien-3β,5α-diol and/or its esters is set forth in the following equation:

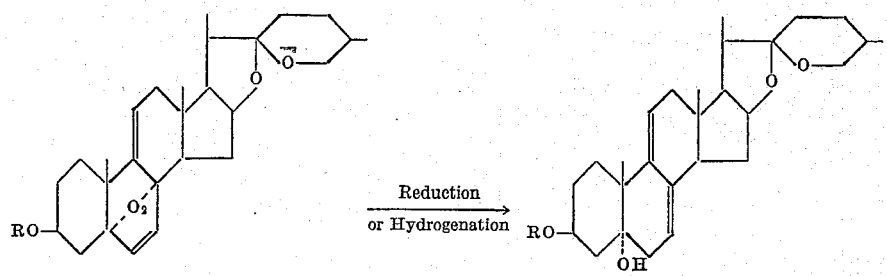

In the above equation R represents the esterification residue of an organic acid of the type conventionally used for the esterification of steroid alcohols and especially the residue of a lower fatty acid such as acetic or propionic.

In general the process above outlined may be practiced by dissolving the lower fatty acid esters as for example the acetate of the 5.8-peroxide of $\Delta^{6,9(11)}$-22a-spirostadien-3β-ol in an inert organic solvent such as dioxane and hydrogenating in the presence of a hydrogenation catalyst such as Raney nickel. Upon purification the corresponding ester such as the 3-acetate of $\Delta^{7,9(11)}$-22a-spirostadiene-3β,5α-diol is obtained. Conventional saponification of the esters resulted in the corresponding free compound. Instead of hydrogenation the same free compound could be prepared by reducing the peroxide starting compound with zinc in an alkaline medium preferably an ethanol solution and the esters can then be prepared by conventional esterification.

Another portion of the process of the present invention is illustrated by the following equation:

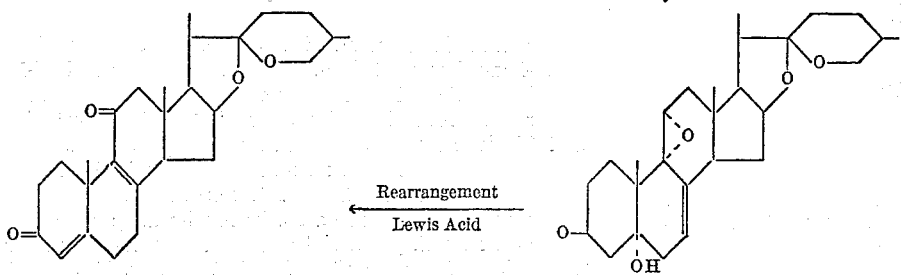

In the above equation R¹ represents the same groups as R hereinbefore set forth and in addition represents hydrogen.

As outlined above an ester such as the 3-acetate of Δ⁷,⁹⁽¹¹⁾-22a-spirostadien-3β,5α-diol (where R¹ represents an esterification residue) is dissolved in an organic solvent such as ether and treated with approximately 1 molar equivalent of an aromatic peracid such as monoperphthalic acid or perbenzoic acid. Preferably the reaction mixture is kept at room temperature for a period of time of the order of two days. The crystalline precipitate was separated and purified to give the desired product i.e. the acetate or other ester of 9α,11α-epoxido-Δ⁷-22a-spirostene-3β,5α-diol. An additional quantity of product could also be obtained by purification and concentration of the mother liquor. Saponification of the ester produced, in a conventional manner as with potassium carbonate, gave the corresponding 9α,11α-epoxido-Δ⁷-22a-spirostene-3β,5α-diol. This same free compound could also be obtained by oxidizing the free Δ⁷,⁹⁽¹¹⁾-22a-spirostadiene-3β,5α-diol in the same manner as the just-described oxidation of the corresponding ester.

For the production of 9α,11α-peroxido-Δ⁷-22a-spirostene-5α-ol-3-one, the free 9α,11α-epoxido-Δ⁷-22a-spirostene-3β,5α-diol as indicated is oxidized with an oxidizing agent capable of converting secondary hydroxy groups into keto groups such as chromic acid preferably in pyridine although chromic acid in acetic acid is also suitable. The last step of the process involves rearrangement with a Lewis acid preferably boron trifluoride in ether although other Lewis acids such as ferric chloride or magnesium bromide may be used to form from 9α,11α-peroxido - Δ⁷ - 22a- spirostene-5α-ol-3-one, the final product of the process above outlined, namely, Δ⁴,⁸-22a-spirostadiene-3,11-dione, a compound possessing both the Δ⁴-3-keto group and the 11-keto group of cortisone. The Δ⁴,⁸-22a- spirostadiene-3,11-dione may be converted to cortisone by catalytic hydrogenation in the presence of a palladium catalyst to first produce Δ⁸-22a, 5α-spirostene-3,11-dione. This last compound on treatment with lithium in liquid ammonia gave the corresponding 3β,11α-diol in the presence of a lower aliphatic alcohol and the 3,11-diketone in the absence of the alcohol. The 3,11-diketone upon selective reduction with sodium borohydride gives 22a,5β-spirostene-3α-ol-11-one which may be conventionally acetylated to the corresponding 3-acetate, a known intermediate for the production of cortisone. The 3β,11α-diol has also been previously converted to cortisone.

Another valuable intermediate for the production of cortisone is prepared in accordance with the present invention as illustrated in the following equation:

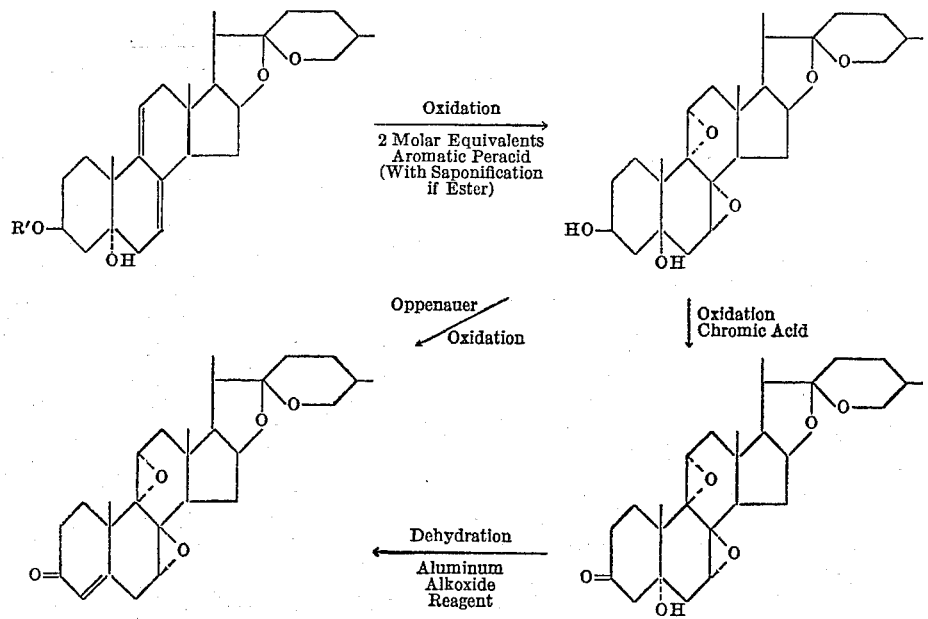

In the above equation R¹ represents the same groups as heretofore set forth.

The above equation illustrates a modification of the process of the present invention wherein the same starting compound utilized in the previously set forth modification, Δ⁷,⁹⁽¹¹⁾-22a-spirostadien-3β,5α-diol or the esters thereof, are treated with approximately 2 molar equivalents of an aromatic peracid such as monoperphthalic or perbenzoic acid under the same conditions as heretofore set forth except that preferably a shorter period of time (of the order of 12 hours) is used. The resultant compound is the corresponding diepoxide, 7α,8α;9α,11α-diepoxido-22a-spirostan-3β,5α-diol.

Similarly when the product of the first step illustrated is treated with an oxidizing agent capable of converting secondary hydroxyl groups to keto groups, such as for example chromic acid in pyridine, there is produced the analogous diepoxide 3-ketone compound, 7α,8α;9α,11α- diepoxido-22a-spirostane-5α-ol-3-one. This last compound was then dehydrated with the use of a reagent as an aluminum alkoxide such as aluminum isopropylate, in the presence of an organic solvent such as toluene to produce the corresponding $\Delta^4$-3-ketone, 7α,8α;9α,11α-diepoxido-$\Delta^4$-22a-spirostene-3-one. This same compound may also be produced directly by treating 7α,8α;9α,11α-diepoxido-22a-spirostane-3β,5α-diol with an Oppenauer reagent i.e. an aluminum alkoxide as set forth, an inert solvent and a ketone hydrogen acceptor as indicated in the equation.

The final product of the last described modification of the process of the present invention, 7α,8α;9α,11α-diepoxide-$\Delta^4$-22a-spirostene-3-one, is a valuable intermediate for the production of cortisone since treatment with potassium hydroxide in ethanol produces from this compound 9α,11α-epoxido-$\Delta^{4,6}$-22a-spirostadiene-8-ol-3-one. This last compound upon treatment with hydrogen in the presence of a palladium catalyst gives the corresponding saturated compound, 9α,11α-epoxido-22a,5β-spirostane-8-ol-3-one. The saturated compound upon treatment with boron trifluoride etherate in benzene gives $\Delta^8$-22a,5β-spirostene-3,11-dione. Treatment of the last mentioned compound with lithium in liquid ammonia gave the saturated 22a,5β-spirostane-3,11-dione and selective reduction with sodium borohydride gave 22a,5β-spirostane-3α-ol-11-one which could be conventionally acetylated to the same 3-acetate, a known cortisone intermediate previously referred to.

The following specific examples serve to illustrate but are not intended to limit the present invention:

Example I

A solution of 3 g. of acetate of the 5,8-peroxide of $\Delta^{6,9(11)}$-22a-spirostadien-3β-ol in 75 cc. of dioxane was hydrogenated in the presence of Raney nickel. The equivalent of 2.2 molar equivalents of hydrogen was consumed. The catalyst was filtered and the filtrate was diluted with water. The white precipitate was collected, washed and dried. Recrystallization from chloroform-hexane afforded 2.4 g. of the 3-acetate of $\Delta^{7,9(11)}$-22a-spirostadiene-3β,5α-diol with a melting point of 263°–265° C., $[\alpha]_D$—6° (chloroform); λ max. 242 mμ (log ε 4.18).

Saponification with potassium carbonate in a mixture of dioxane, methanol and water gave the free $\Delta^{7,9(11)}$-22a-spirostadiene-3β,5α-diol with a melting point of 214°–216° C., $[\alpha]_D=0°$; λ max. 242 mμ (log ε 4.17).

Example II

A solution of 4 g. of the 3-acetate of $\Delta^{7,9(11)}$-22a-spirostadiene-3β,5α-diol in 30 cc. of chloroform was treated with one molar equivalent of monoperphthalic acid in ether and the mixture was kept standing at room temperature for two days. A crystalline precipitate separated during this time, which was filtered, washed with aqueous sodium bicarbonate solution and water, thus yielding 3.1 g. of the monoepoxide acetate with a melting point of 295°–298° C. Purification and concentration of the mother liquor afforded an additional 0.5 g. with slightly lower melting point. The pure product, namely the acetate of 9α,11α-epoxide-$\Delta^7$-22a-spirostene-3β,5α-diol had a melting point of 299°–301° C., $[\alpha]_D$ —42° (chloroform).

Saponification of this compound with potassium carbonate in solution in dioxane, methanol and water gave 9α,11α-epoxido-$\Delta^7$-22a-spirostene-3β,5α-diol with a melting point of 226°–228° C., $[\alpha]_D$ 60°. This same compound can be obtained by oxidation of the free $\Delta^{7,9(11)}$-22a-spirostadiene-3β,5α-diol, obtained in accordance with Example I.

Example III 1.5 g. of chromic anhydride was dissolved in 150 cc. of pyridine, the solution was cooled in an ice bath and then added to a solution of 1.44 g. of 9α,11α-epoxido-$\Delta^7$-22a-spirostane-3β,5α-diol in 50 cc. of pyridine and the mixture was kept standing for 14 hours at room temperature. It was then diluted with much water and extracted with ether. The ether solution was washed with very dilute hydrochloric acid and water, dried and evaporated to dryness. The residue was crystallized from acetone-hexane, thus yielding 1.2 g. of 9α,11α-epoxido-$\Delta^7$-22a-spirosten-5α-ol-3-one with a melting point of 236°–238° C., $[\alpha]_D$—40° (chloroform).

Example IV 0.5 g. of the keto-monoepoxide, obtained in accordance with Example III was dissolved in 100 cc. of anhydrous benzene and 10 cc. of solvent was distilled in order to remove traces of moisture. 0.5 cc. of boron trifluoride in ether was added and the mixture was refluxed for 2 minutes and immediately afterwards the solution was mixed with an excess of water and evaporated to dryness. The residue was chromatographed with deactivated alumina; elution with benzene-ether (9:1), followed by crystallization from acetone-hexane afforded 0.14 g. of $\Delta^{4,8}$-22a-spirostadiene-3,11-dione with a melting point of 205°–206° C., $[\alpha]_D$+289° (chloroform); λ max. 242 mμ (log ε 4.32).

Example V

A solution of 1 g. of $\Delta^{7,9(11)}$-22a-spirostadiene-3β,5α-diol, obtained in accordance with the method described in Example I, in 15 cc. of methylene chloride was treated with an ether solution of monoperphthalic acid (10 cc. of a 1.05 normal solution) and the mixture was kept standing overnight at room temperature. It was then worked up in accordance with the method described in Example II, and after recrystallization of the substance from acetone there was obtained 0.91 g. of 7α,8α;9α,11α-diepoxide-22a-spirostane-3β,5α-diol with a melting point of 277°–280° C., $[\alpha]_D$—72° (chloroform).

Example VI 0.5 g. of the diepoxido-diol, obtained in accordance with Example V, was dissolved in 15 cc. of pyridine and oxidized with a solution of 0.5 g. of chromic anhydride in 50 cc. of pyridine in accordance with the method described in Example III. Recrystallization from methanol gave 7α,8α;9α,11α-diepoxido-22a-spirostan-5α-ol-3-with a melting point of 282°–284° C., $[\alpha]_D$—52° (chloroform).

Example VII 0.17 g. of 7α,8α;9α,11α-diepoxido-22a-spirostane-3β,5α-diol, obtained in accordance with Example V, was dissolved in 17cc. of toluene and 0.17 cc. of cyclohexanone and 4 cc. of the mixture was distilled in order to remove traces of moisture. 0.4 g. of aluminum isopropylate was then added in 3 cc. of toluene and the mixture was subjected to a slow distillation in such a way that 5 cc. of solvent distilled in the course of 30 minutes. The cooled solution was treated with a solution of sodium potassium tartrate and diluted with ether. The ether layer was washed with water, concentrated under reduced pressure and the residue was crystallized from acetone-hexane, thus yielding 0.08 g. of 7α,8α;9α,11α-diepoxido-$\Delta^4$-22a-spirosten-3-one with a melting point of 262°–264° C., $[\alpha]_D$+46° (chloroform); λ max. 236 mμ (log ε 4.16).

The same compound is obtained when the keto-diepoxide obtained in accordance with Example VI is subjected to the treatment just described with omission of hydrogen acceptor.

We claim:

1. A process for the production of a compound selected from the class consisting of 9α,11α-epoxido-$\Delta^7$-22a-spirostene-5α-ol-3-one and 7α,8α;9α,11α-diepoxido-22a-spirostane-5α-ol-3-one which comprises reducing a 3-lower fatty acid ester of the 5,8-peroxide of $\Delta^{6,9(11)}$-22a-spirostadiene with zinc in alkaline ethanol solution and forming a compound selected from the group consisting of $\Delta^{7,9(11)}$-22a-spirostadiene-3β,5α-diol and 3-lower fatty acid esters thereof, oxidizing said last mentioned compound with an aromatic peracid to form a compound selected from the group consisting of the 9α,11α-epoxide and the 7α,8α;9α,11α-diepoxide thereof, and oxidizing the 3-hydroxy group of the last compounds with a chromic acid.

2. A process for the production of a steroidal compound selected from the group consisting of $\Delta^{7,9(11)}$-22a-spirostadiene-3β,5α-diol and 3-lower fatty acid esters thereof which comprises reducing a 3-ester of the 5,8-peroxide of $\Delta^{6,9(11)}$-22a-spirostadiene-3β-ol with zinc in alkaline ethanol solution.

3. A process for the production of $\Delta^{7,9(11)}$-22a-spirostadiene-3β,5α-diol which comprises treating a lower fatty acid ester of the 5.8-peroxide of $\Delta^{6,9,(11)}$-22a-spirostadiene-3β-ol with zinc in alkaline ethanol solution.

4. A process for the production of a compound selected from the group consisting of 9α,11α-epoxido-$\Delta^7$-22a-spirostene-3β,5α-diol, 3-esters thereof, 7α,8α;9α,11α-diepoxido-22a-spirostene-3β.5α-diol and 3 esters thereof which comprises treating a compound selected from the class consisting of $\Delta^{7,9(11)}$-22a-spirostadiene-3β,5α-diol and esters thereof with an aromatic peracid.

5. The process of claim 4 wherein the monoepoxide is formed and approximately 1 molar equivalent of an aromatic peracid is used.

6. The process of claim 4 wherein the diepoxide is formed and approximately 2 molar equivalents of an aromatic peracid are used.

7. A process for the production of $\Delta^{4,8}$-22a-spirostadiene-3,11-dione which comprises treating a compound selected from the group consisting of $\Delta^{7,9(11)}$-22a-spirostadiene-3β,5α-diol and lower fatty acid esters thereof with approximately 1 molar equivalent of an aromatic peracid, treating 9α,11α-epoxido-$\Delta^7$-22a-spirostene-3β,5α-diol thus produced, with chromic acid to form 9α,11α-epoxido-$\Delta^7$-22a-spirostene-5α-ol-3-one and treating this last-mentioned compound with a boron trifluoride.

8. A process for the production of 9α,11α-epoxido-$\Delta^7$-22a-spirostene-5α-ol-3-one which comprises treating 9α,11α-epoxido-$\Delta^7$-22a-spirostene-3β,5α-diol with chromic acid.

9. A process for the production of $\Delta^{4,8}$-22a-spirostadiene-3,11-dione which comprises treating 9α,11α-expoxido-$\Delta^7$-22a-spirostene-5α-ol-3-one with a boron trifluoride.

10. A process for the production of 7α,8α;9α,11α-diepoxido-$\Delta^4$-22a-spirostene-3-one which comprises oxidizing 7α,8α;9α,11α-diepoxido-22a-spirostane-3β,5α-diol with chromic acid to form the corresponding 3-ketone and treating the ketone with an aluminum alkoxide in the presence of an inert solvent.

11. A process for the production of 7α,8α;9α,11α-diepoxido-$\Delta^4$-22a-spirostene-3-one which comprises treating 7α,8α;9α,11α-diepoxido-22a-spirostane-3β,5α-diol with an aluminum alkoxide in the presence of a ketone hydrogen acceptor and an inert solvent.

12. A new compound selected from the class consisting of 9α,11α-epoxido-$\Delta^7$-22a-spirostene-3β,5α-diol, lower fatty acid esters thereof, 7α,8α;9α,11α-diepoxido-22a-spirostene-3β,5α-diol and lower fatty acid esters thereof.

13. The 3-acetate of 9α,11α-epoxido-$\Delta^7$-22a-spirostene-3β,5α-diol.

14. 9α,11α-epoxido-$\Delta^7$-22a-spirostene-3β,5α-diol.

15. A new compound selected from the class consisting of 9α,11α-epoxido-$\Delta^7$-22a-spirostene-5α-ol-3-one and 7α,8α;9α,11α-diepoxido-22a-spirostane-5α-ol-3-one.

16. 9α,11α-epoxido-$\Delta^7$-22a-spirostene-5α-ol-3-one.

17. $\Delta^{4,8}$-22a-spirostadiene-3,11-dione.

18. The 3-acetate of 7α,8α;9α,11α-diepoxido-22a-spirostane-3β,5α-diol.

19. 7α,8α;9α,11α-diepoxido-22a-spirostane-3β,5α-diol.

20. 7α,8α;9α,11α-diepoxido-22a-spirostane-5α-ol-3-one.

21. 7α,8α;9α,11α-diepoxido-$\Delta^4$-22a-spirostene-3-one.

References Cited in the file of this patent

UNITED STATES PATENTS

| | | |
|---|---|---|
| 2,695,288 | Wendler | Nov. 23, 1954 |
| 2,741,626 | Laubach | Apr. 10, 1956 |

OTHER REFERENCES

Rosenkranz et al.: J.A.C.S., vol. 75, pages 4430–32 (1953).